United States Patent [19]
Jarzombek

[11] Patent Number: 5,358,075
[45] Date of Patent: Oct. 25, 1994

[54] BRAKE MOVEMENT AND ADJUSTMENT MONITORING DEVICE

[76] Inventor: Richard J. Jarzombek, 853 Osborn Ave., Baiting Hollow, N.Y. 11933

[21] Appl. No.: 82,533

[22] Filed: Jun. 25, 1993

[51] Int. Cl.⁵ ............................................. F16D 66/00
[52] U.S. Cl. .................................. 188/1.11; 340/454
[58] Field of Search ......................... 188/1.11, 79.55; 116/208, 285; 340/454

[56] References Cited

U.S. PATENT DOCUMENTS

| | | | |
|---|---|---|---|
| 3,776,329 | 12/1973 | Hope et al. | 188/1.11 |
| 4,649,370 | 3/1987 | Thomason | 188/1.11 X |
| 4,757,300 | 7/1988 | Sebalos | 188/1.11 X |
| 4,800,991 | 1/1989 | Miller | 188/1.11 |
| 4,883,150 | 11/1989 | Arai | 188/1.11 X |
| 5,213,056 | 5/1993 | Nicholls et al. | 116/208 |
| 5,226,509 | 7/1993 | Smith | 116/208 X |

FOREIGN PATENT DOCUMENTS 255114 10/1988 Japan .................................. 188/1.11

*Primary Examiner*—Robert J. Oberleitner
*Assistant Examiner*—Kevin D. Rutherford
*Attorney, Agent, or Firm*—Richard L. Miller

[57] ABSTRACT

A vehicle brake wear warning system, comprising a displacement sensor, for determining the relative displacement necessary to fully actuate a brake. The displacement sensor has a piston, which operates in a shaft. The movement of the piston within the shaft is relative to the distance the brake's slack adjuster must move to fully actuate the brake. When the brakes are actuated, the location of the piston in the shaft of the displacement sensor becomes relevant in determining brake wear. The displacement sensor is sensitive to the position of the piston within the shaft. If the piston rests within a first range in the shaft, a small amount of brake wear is present, and a safe condition is indicated. If the piston rests within a second range in the shaft, a medium amount of brake wear is present, and the system will notify the driver that a brake adjustment is appropriate. If the piston rests within a third range in the shaft, a large amount of brake wear is present, and a dangerous condition is indicated to the driver. The logic of the system is such that a safe condition will be indicated if all brakes demonstrate a small amount of brake wear. But, if any brake demonstrates a medium or large amount of brake wear, an adjustment appropriate, or dangerous condition will be indicated, respectively.

3 Claims, 2 Drawing Sheets

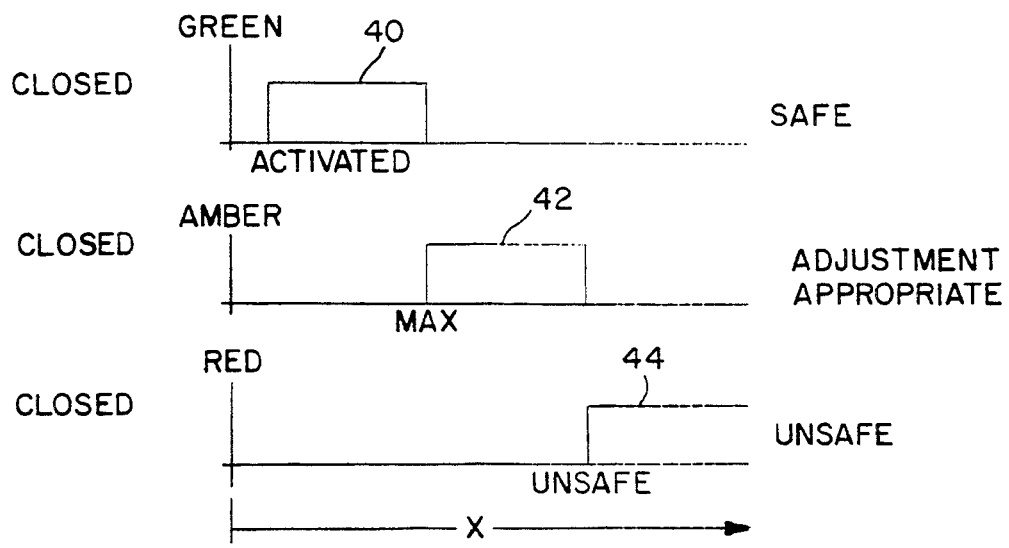
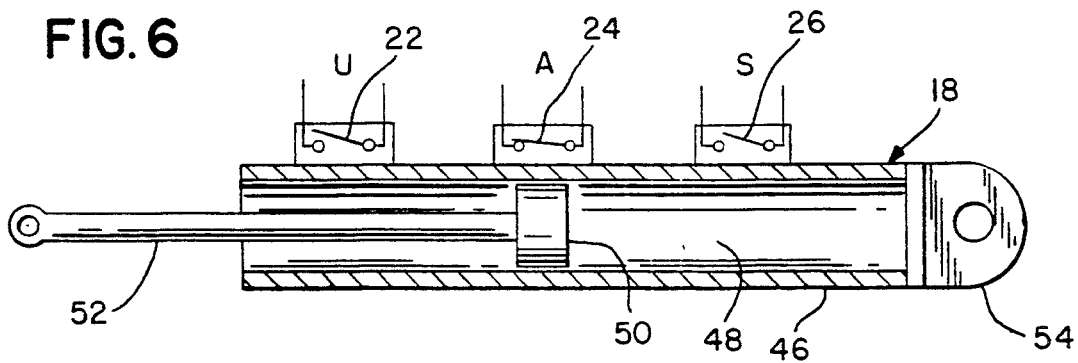

BRAKE MOVEMENT AND ADJUSTMENT MONITORING DEVICE

BACKGROUND OF THE INVENTION

The invention relates to a warning system for vehicle brakes typically but not necessarily trucks.

The reliability of the brakes in a vehicle is a constant source of concern for vehicle drivers. A worn brake pad or drum can cause expensive damage to the braking system, and can create a dangerous condition.

It is therefore desirable for the vehicle driver to have a reliable system that will indicate the present status of the vehicle's brakes, and warn the driver when service is merely desirable, and when it is absolutely necessary.

U.S. Pat. No. 4,800,991 to Miller, discloses a system that monitors brake component motion when the brakes are applied, and indicates when motion of the component has surpassed a predetermined distance.

U.S. Pat. No. 4,832,160 to Fargier et al, discloses a wear indicator, in which an electrically connecting loop is contained within a friction member. Electrical continuity is broken in the loop after there is substantial wear.

U.S. Pat. No. 5,088,042 to Brearley et al., discloses a system for apportioning braking actuation among several brakes, according to the axle loads present.

While these units may be suitable for the particular purpose to which they address, or to general use, they would not be as suitable for the purpose of the present invention as hereafter described.

SUMMARY OF THE INVENTION

It is an object of the invention to produce a vehicle brake warning system that overcomes that shortcomings of prior art brake warning systems.

It is another object of the invention to provide a system that will indicate when brake wear is within safe, tolerable limits.

It is yet another object of the invention to provide a system that will warn the user when brake wear levels indicate that an adjustment is appropriate.

It is a further object of the invention to provide a system that will detect when a dangerous level of wear exists, necessitating immediate servicing.

It is a still further object of the invention to provide a system that will determine the brake status automatically, whenever the brake pedal is depressed.

It is a still further object of the invention to produce a brake warning system that is economical to manufacture.

The invention comprises a displacement sensor, for determining the relative displacement necessary to fully actuate a brake. The displacement sensor has a piston, which operates in a shaft. The movement of the piston within the shaft is relative to the distance the brake's slack adjuster must move to fully actuate the brake. When the brakes are actuated, the location of the piston in the shaft of the displacement sensor becomes relevant in determining brake wear. The displacement sensor is sensitive to the position of the piston within the shaft. If the piston rests within a first range in the shaft, a small amount of brake wear is present, and a safe condition is indicated. If the piston rests within a second range in the shaft, a medium amount of brake wear is present, and the system will notify the driver that a brake adjustment is appropriate. If the piston rests within a third range in the shaft, a large amount of brake wear is present, and a dangerous condition is indicated to the driver. The logic of the system is such that a safe condition will be indicated if all brakes demonstrate a small amount of brake wear. But, if any brake demonstrates a medium or large amount of brake wear, an adjustment appropriate, or dangerous condition will be indicated, respectively.

A further object is to provide a brake warning systems that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described, within the scope of the claims.

BRIEF DESCRIPTION OF THE DRAWINGS

In the drawings, like reference numerals depict like elements throughout the several views. The drawings are briefly described as follows:

FIG. 5 is a graphical representation of the ranges of displacement within which each state is detected.

FIG. 6 is an enlarged cross sectional view of just the displacement sensor, indicated by arrow 6 in FIG. 3.

DETAILED DESCRIPTION OF THE PREFERRED EMBODIMENT

Figure 1:
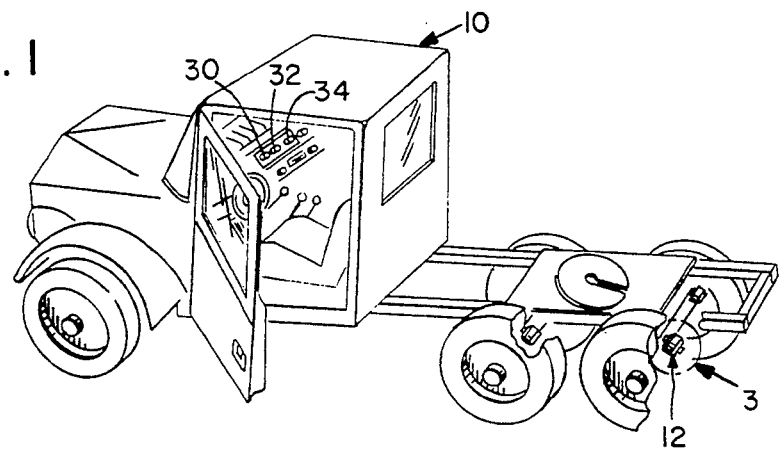
FIG. 1 is a diagrammatic perspective view, illustrating a vehicle with the instant invention installed thereon.

Turning now descriptively to the drawings, in which similar reference characters denote similar elements throughout the several views, FIG. 1 illustrates the location of the invention at each brake on a vehicle 10. The presence of the brake air chamber 12 relative to the vehicle and the typical placement of a set of indicators typically colored warning indicators in the cab of the vehicle are also indicated.

Figure 2:
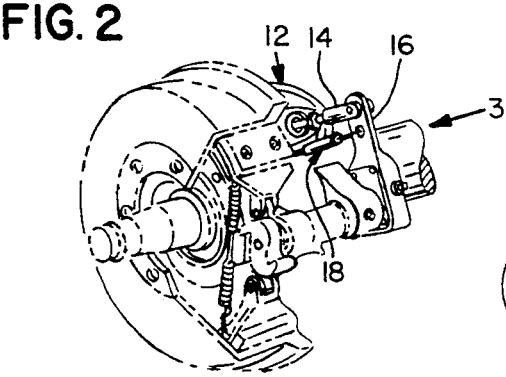
FIG. 2 is a diagrammatic perspective view of a typical brake system for a wheel with the instant invention installed thereon.

FIG. 2 illustrates a typical brake system with the invention installed. The brake is actuated normally by the loss of air in the air chamber 12, which causes a spring (not shown) to force a pushrod 14 outward to actuate the brake. The pushrod moves a slack adjuster 16, which converts the linear force of the pushrod to a twisting force, or torque, for actuating the actual brake mechanism, shown in phantom lines.

The distance that the pushrod 14 must travel to actuate the brake is indicative of the brake wear. As the brakes wear, the pushrod must travel a larger distance to actuate the brake. A displacement sensor 18, mounted between the air chamber 12 and slack adjuster 16, monitors the motion of the pushrod 14.

Figure 3:
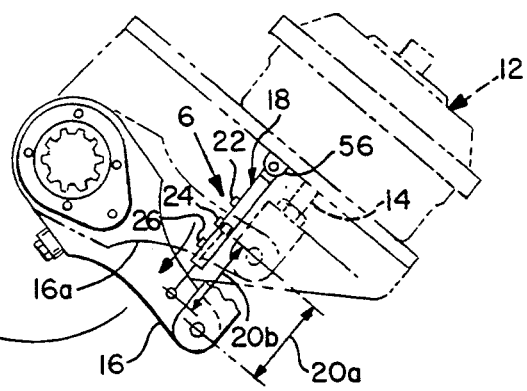
FIG. 3 is an enlarged diagrammatic view taken in the direction of arrow 3 in FIG. 1 and FIG. 3, illustrating the placement of displacement sensing apparatus on a brake system for an individual wheel.

FIG. 3 further demonstrates how the displacement sensor monitors the motion of the pushrod 14 when the brake is actuated. The slack adjuster 16 moves between its normal position, where the brake is not actuated, to its actuated position 16a, shown in phantom, where the brake is actuated. The slack adjuster moves through a slack adjuster movement range 20a. The displacement sensor 18, moves through a displacement sensor movement range 20b, which corresponds to the slack adjuster movement range 20a.

The displacement sensor 18 comprises three displacement sensing switches, for reflecting the movement of the slack adjuster, including: an unsafe sensing switch 22, an adjustment appropriate sensing switch 24, and a safe sensing switch 26.

Figure 4:
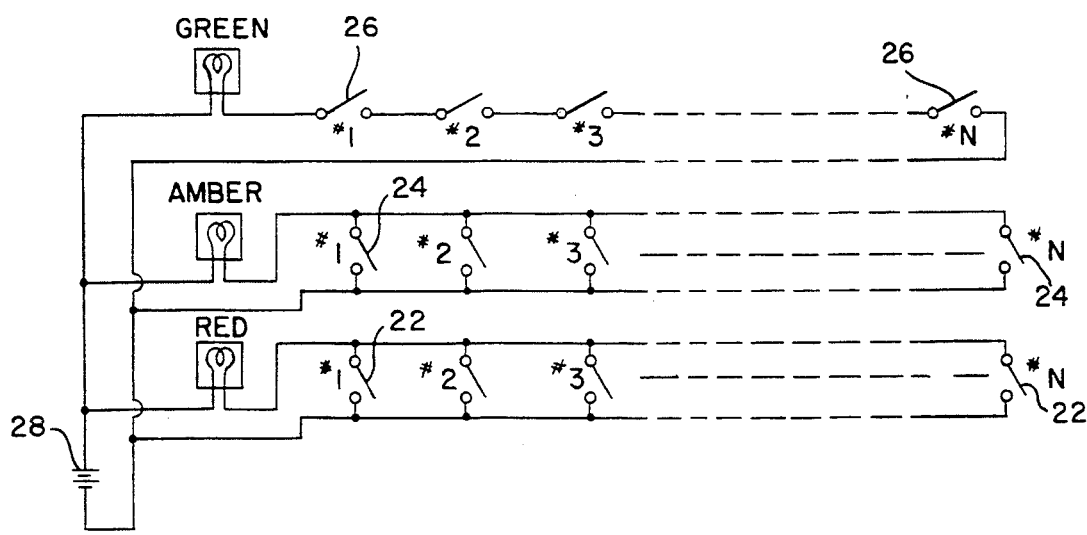
FIG. 4 is a schematic diagram for the instant invention, installed on a vehicle with N wheels.

FIG. 4 shows how the sensing switches of the brakes on a vehicle with N-wheels are connected to create a warning system. The system is connected to a battery 28 typically but not necessarily the battery used by the vehicles electrical system. The safe sensing switches 26, which are normally open switches, for each wheel are all connected in series with each other and a first indicator 30 typically green. The battery 28 completes the circuit. Therefore, in order for a current to flow from the battery, through the first indicator 30, illuminating the first indicator 30, each and every safe sensing switch 26 must be closed. If any of the safe sensing switches 26 is open, there will be an incomplete circuit, and the first indicator 30 will not illuminate. Assuming the warning system is working correctly this would immediately indicate to the driver that at least one brake assembly is not operating at all.

All adjustment appropriate sensing switches 24, which are normally open switches, are connected in parallel with each other, with an second indicator 32 typically amber and the battery 28 connected in series with the aforementioned parallel combination. Therefore, a current will flow from the battery 28 through the second indicator 32, illuminating the second indicator 32, when any one of the adjustment appropriate sensing switches 24 is closed.

All unsafe sensing switches 22, which also are normally open switches, are connected in parallel with each other, with a third indicator 34 typically red and the battery connected in series with the aforementioned parallel combination. Therefore, a current will flow from the battery 28 through the third indicator 34, illuminating the third indicator 34, when any one of the unsafe sensing switches 22 is closed.

FIG. 5 shows how the monitored ranges are arranged consecutively with respect to the displacement, along a displacement range X. The first range is the range which is to indicate a safe driving condition. All the safe sensing switch 26, should be closed throughout this range, which should begin at a point where the brakes are first activated, and extend to the maximum normal wear condition.

The second range is the range which is to indicate that an adjustment is appropriate. The adjustment appropriate sensing switch 24, should be closed throughout this range, which should begin at the point where maximum normal wear is present, and extend to the point where unsafe wear is present.

The third range is the range which is to indicate that an unsafe driving condition is present. The unsafe sensing switch 22, should be closed throughout this range, which should begin at the point where unsafe wear is present.

FIG. 6 is a detail of a construction of a typical displacement sensor. The displacement sensor has a cylindrical housing 46, which has a shaft 48 through the center. A piston 50 moves through the shaft 48 along the length of the cylinder that the housing comprises. The piston 50 is attached to a connecting rod 52 on a first end. The connecting rod is connected on a second other end to the slack adjuster 16, so that the piston's movements will be responsive to the movements of the slack adjuster 16. A mounting eye 54 on the housing 46 is rotatively attached to a stationary ear 56 on the vehicle frame near the air chamber 12.

The sensing switches 22, 24 and 26 are mounted along the cylinder of the housing. They are each mounted in a position where they will detect the piston while it is within the corresponding range. The actual positioning of the sensors along the housing is determined by the particular brake system in which the invention is to he installed.

In this embodiment, reed switches are used for each switch. The piston contains a magnet, so that the reed switches will be closed when the piston is in close proximity.

Other embodiments may use a hall effect switch, or any sensing device that may properly indicate when the piston is within the desired range.

In other embodiments, other schemes may be employed for sensing the relative movements of the braking components. In general, any component may be used that will reveal brake wear by increasing its movement on brake actuation.

What is claimed is:

1. A vehicle brake wear warning system, comprising:
   at least two displacement sensors, each for monitoring movement of a brake component whose movement during each brake actuation increases as a brake wears, each displacement sensor comprising:
   a housing with a shaft extending therein;
   a connecting rod having a first end extending into the shaft of the housing and an opposite end connected to the brake component so that the connecting rod will move progressively along the shaft as the brake is actuated, the distance that the connecting rod moves in the shaft being dependent on relative wear of the brake;
   a piston, attached to the first end of the connecting rod for movement with the connecting rod; and
   a sensing means attached to each housing, for sensing the position of a piston within the shaft, to determine the degree of wear to the brake when the brake is actuated;
   the sensing means comprising:
   a magnet, attached to the piston;
   first, second and third sensing switches positioned in serial relation relatively along the housing shaft for sequential operation by magnet for sensing, when the piston is within respective ranges indicating that the brake has a safe level of wear; a level of wear for which an adjustment would be appropriate; and a level of wear that is unsafe, respectively;
   a first, a second and a third warning lamp, each differently colored, for monitoring the sensing means, and a battery,
   the first sensing switches being normally open switches connected in series with each other and with the first warning lamp and the battery completing the circuit,
   the second sensing switches being normally open switches connected in parallel with each other and with the second warning lamp with the battery connected in series therewith, the third sensing switches being normally open switches connected in parallel with each other and with the third warning lamp and the battery connected in series therewith, whereby the first lamp will be illuminated only when all displacement sensors detect a level of wear that is safe, the second lamp will be illuminated when at least one displacement sensor detects a level of wear where adjustment is required and the third lamp will be illuminated when at least one displacement sensor detects an unsafe level of wear and the first, second and third lamps will be illuminated sequentially when operating the brake.

2. The vehicle brake wear warning system as recited in claim 1, where the brake component whose movement during each brake actuation increases as the brake wear is a brake system slack adjuster.

3. The vehicle brake wear warning system as recited in claim 2, where the housing is fixed to a frame of a vehicle near the air chamber of the brake.

* * * * *